Jan. 3, 1967  S. R. WARNER  3,295,431
AIR DISTRIBUTION SYSTEM FOR A SELF-PROPELLED
LAND VEHICLE SUCH AS AN AUTOMOBILE
Filed Dec. 31, 1964
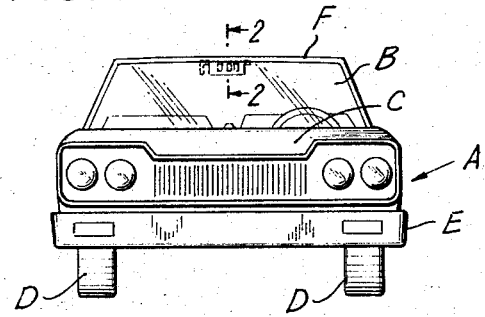
FIG. 1
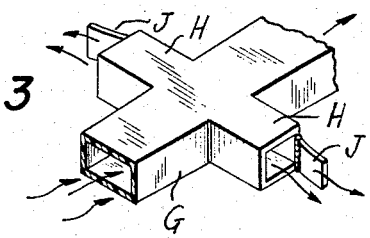
FIG. 3
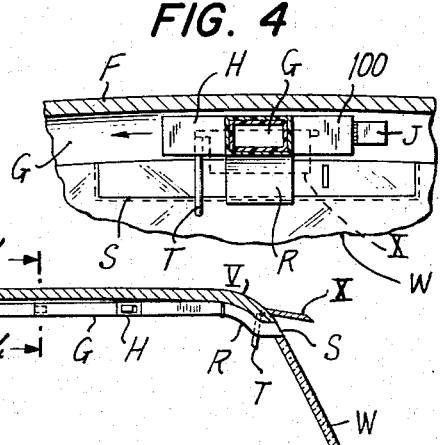
FIG. 4
FIG. 2
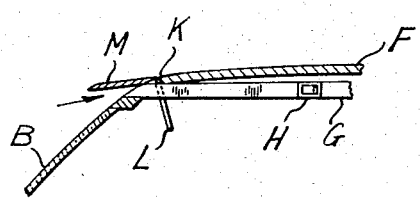
FIG. 5
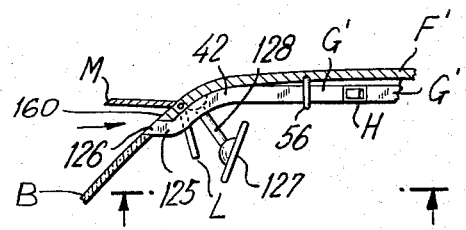
FIG. 6
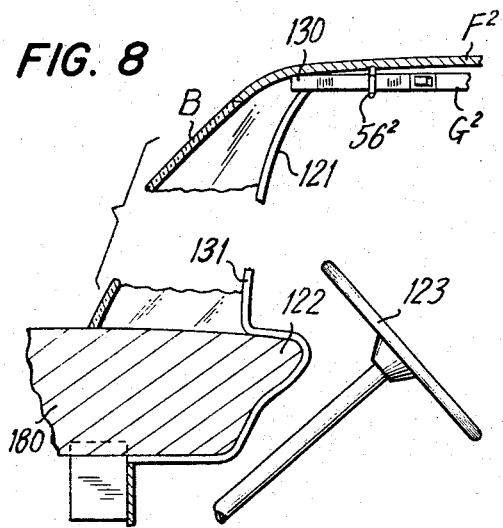
FIG. 8
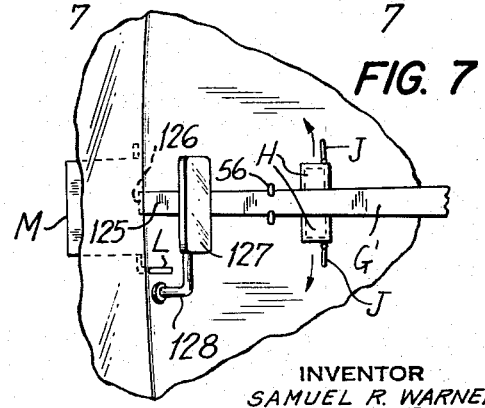
FIG. 7
INVENTOR
SAMUEL R. WARNER
BY
ATTORNEY

3,295,431
AIR DISTRIBUTION SYSTEM FOR A SELF-PROPELLED LAND VEHICLE SUCH AS AN AUTOMOBILE
Samuel R. Warner, 75—16 Vleigh Place, Flushing, Long Island, N.Y. 11367
Filed Dec. 31, 1964, Ser. No. 422,579
1 Claim. (Cl. 98—2)

The present invention relates to an air distribution system and it particularly relates to an air distribution system for a self-propelled land vehicle such as an automobile. It is, however, to be understood that the system disclosed may less preferably be utilized for distribution of air and for ventilation in other types of enclosures and particularly in moving enclosures to achieve a thorough distribution of air within the enclosed vehicle, whether it be a ground or airborne vehicle.

It is among the objects of the present invention to provide an automobile ventilating system which will assure comfortable ventilation of the interior of an automotive vehicle even when the windows are closed, without drafts or discomfort to the passengers and driver and which will assure a uniform and rapid diffusion of fresh incoming air through the interior without drafts or localized temperature differentiations.

Another object is to provide a method of ventilating and cooling the interior of an automotive vehicle particularly in summer or at elevated atmospheric temperature conditions in which the ventilating system may be readily installed without complicated body constructions and extensive alteration of the roof or sides of the car enclosure and which will be reliable in operation and at the same time may be readily taken out of operation in cold weather and restored to operation in warm weather.

A particular object of the present invention is to be able to exhaust the interior stale or smoky air of an automotive vehicle with incoming fresh air without causing undue turbulence at the passenger level and which will be effective even in rainy or snowy weather without likelihood of too much moisture entering the interior of the car.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory according to one embodiment of the present invention to provide a conduit extending the length of the roof of the body of a vehicle and desirably mounted closely adjacent to and up against the interior of the roof of the vehicle.

This device may consist of a single central conduit extending longitudinally of the vehicle or a series of parallel or inclined conduits arranged in side-by-side or converging relationship.

The device may be permanently mounted or it may be readily removably mounted so that it can be removed for cleaning and thereafter quickly reinstalled without the need of special tools or the services of an automotive mechanic.

In the preferred form, the longitudinally extending conduit has an inlet at the front of the body above the windshield and desirably immediately under the roof and this inlet will scoop up or pick up air as a result of the movement of the vehicle through the atmosphere. This scoop may be protected by a hinge cover in inclement or cold weather and it may be positioned in the middle upper top portion of the windshield or in the metallic body of the roof directly above the center of the windshield.

The air conduit then may extend longitudinally to the rear of the vehicle directly under the roof and along its course it may have a plurality of spaced air outlets to direct the air obliquely toward either side of the conduit.

This directional effect may be achieved by furnishing a series of ports having rearwardly obliquely directed outlet members which assure distribution of the air over the entire interior body of the vehicle.

Desirably, there should be a smaller opening at the front of the vehicle, say for example about 1″ in height and about 2½ to 3″ in width.

The conduit extending longitudinally backward to the rear of the interior of the body of the vehicle closely adjacent the roof may gradually become wider toward the rear of the vehicle and have pairs of side outlets spaced 2 to 3 feet apart and desirably three or at the most four pair may be utilized.

Each side outlet should have a duct which will direct the air more or less perpendicularly to the direction of flow through the main duct so that there will not be any violent interior currents.

The entire interior structure of the conduit may be of a transparent or even a translucent plastic and it less preferably may be of a light weight material such as aluminum or even bronze.

The front inlet to the conduit, as well as each of the side outlets, may be provided with independent adjustable doors or closures or louvers. In this way, each passenger may adjust the opening or direction of flow out through the side ports to suit his or her desires.

If desired, a ball type adjustable outlet may be employed which will permit not only rotation to control the direction of air flow but also a screw adjustment to shut off the air flow or to regulate the amount of air flow in any desired area of the vehicle.

Toward the rear window of the car the conduit may preferably widen by 10 to 40% without an increase in height and the air outlet may be desirably caused to extend through the rear sides of the car.

Preferably, however, the air outlets are at the rear either in the upper portion of the rear window or in the portion of the body directly above the rear window and the opening, if desired, may be as much as 5 to 6″ in width with an extension of 3″ on each side to give additional air outlet area.

When the conduit is closed in the front this additional outlet area in the rear will permit the stale air or smoky air to be exhausted even though the front of the conduit is closed.

Desirably the conduit is of a clear plastic and the shutters are also of clear plastic and they may overhang the front and rear openings by about 1 to 2″. This will prevent entrance of water during rainstorms when the shutters are open and will also prevent snow or sand and will reduce the amount of dust on dusty roads.

At the same time, where clear plastic is used this will not in any manner interfere with one's vision or ability to see forwardly in the direction of movement of the vehicle.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

FIGURE 1 is a front elevational view of an automotive vehicle showing the conduit from the front of the vehicle inserted in the top of the windshield or where the roof meets the windshield.

FIG. 2 is a transverse longitudinal sectional view upon the line 2—2 of FIG. 1.

FIG. 3 shows a fragmentary perspective view of a conduit section with the through passageways and the side outlet ports being indicated together with the hinged control shutters.

FIG. 4 is a transverse sectional view on the line 4—4 of FIG. 2, upon an enlarged scale as compared to FIG. 2.

FIG. 5 is a fragmentary transverse sectional view at the front of the automotive vehicle, showing the shutter in one position with the inlet of the conduit being in the roof above the front windshield.

FIG. 6 is a fragmentary transverse sectional view similar to FIG. 5 showing an alternative embodiment in which the inlet is positioned in the upper portion of the windshield adjacent the upper end thereof.

FIG. 7 is a lower view of the structure of FIG. 6 taken upon the line 7—7 of FIG. 6.

FIG. 8 is a transverse sectional view of the front portion of the interior body of the vehicle showing the combination of the conduit of the present application with a hot air heater or the air conditioner of an automotive vehicle.

FIGS. 1 to 5 show an automotive vehicle A having a front windshield B, an engine enclosure C, tires D and a front bumper E.

The front of the windshield B in its upper central portion adjacent to the roof F has an opening in which is inserted the front end of the longitudinal conduit G.

This internal conduit G is provided with a series of side ports H usually arranged in pairs on opposite sides of the main conduit G.

The side outlets H are provided with adjustable covers J. The adjustable covers J may be used to open or close the passageway through the transverse extensions H depending upon the wishes of the driver or passenger of the vehicle.

In FIGS. 2 and 5 there is shown a swinging front cover K which has a handle portion L and a closure portion M.

When the shutter is open in the position indicated in FIG. 3 the maximum amount of air will be dispensed. However, if desired to move it to an innermost position against the cross conduit H the air can be cut off altogether.

The rear closure X also is pivotally mounted and has a handle T. By means of the handle T the closure X may be opened or closed.

However, if the driver desires air or to disperse any stale air out of the interior of the vehicle all he has to do is to open the shutter portion by the handle L and regulate the air flow.

In the rear windshield W or at the rear roof line V as shown in FIG. 4, the main conduit G at R is offset or descends slightly and it terminates in the extended outlet opening S. The extended outlet opening S will permit removal of air particularly if smoky or stale from the interior of the vehicle even if the flow or inlet portion of the main channel G has been closed.

In turning the vanes X, the handle T is employed, permitting adjustment by the person riding within the car, to the desired closure position.

The device as shown in FIGS. 1 to 5 also has a rear swinging window closure having closure flap X and a handle T.

The closure flap X will serve to open or close the rear outlet openings Z.

In the alternative embodiment of FIG. 6 the same parts are indicated by the same letters as in FIGS. 1 to 5 primed (').

In FIG. 6 the roof F' carries the conduit G'.

The device is attached to the ceiling by means of a spring clamp 56 which permits the conduit G' to be snapped into place or removed at any time.

In FIG. 6 the front end 42 of the conduit G' has a turn downward, as indicated at 125, where it opens at 126 into the front windshield B at the upper central portion thereof just below the edge 160 of the car body.

In FIG. 6 there is also shown a rear view mirror 127 which is supported by the rod member 128 attached to the upper front portion of the roof of the vehicle. This rod 128 will bypass and be outside of the shutter L and it will not interfere with the operation of the shutter L and at the same time the shutter L will not interfere with the operation of the vent closure device M.

In the embodiment of FIG. 8 there is shown a roof $F^2$ with a conduit $G^2$ having a clamp $56^2$.

The front windshield B will extend forwardly of the front end 130 of the conduit $G^2$ and will be closed off and the front connection will be through the pipes or conduits 121 and 122 beyond the steering wheel 123.

The dashboard 180 supports the conduit or tubing 122 which runs upwardly as indicated at 131. It is important in this type of structure that there not be any great gaps between the driver's compartment and the passenger compartments which might tend to militate against the comfort of the passenger in either the front or rear of the vehicle and particularly the front and rear of an automobile.

It is thus apparent that the applicant has provided a simple, readily installed, detachable conduit member which may be used for ventilating and assuring removal of stale or smoky air from the body of an automotive vehicle.

This will be effective even though the front of the conduit be closed.

The distribution or inflow—outflow system of the present application not only permits ready cleansing of the air of a car of smoke and staleness but also will permit thorough distribution of cooling or heating air which may be admitted to the conduit G and it will be thoroughly and completely mixed with and distributed throughout the body of the car through the side passageways H and an adjustable shutter J.

An important feature of the present application resides in the fact that the stale air within the interior of the automobile is swept out by the air currents that are circulated in the interior of the automobile and any stale air in the car is thoroughly exhausted so that the air within the car will always be freshened for the occupants thereof.

Furthermore, any of the stale, stagnant heated air will normally rise to the top of the interior of the car and will be readily swept away by the incoming air and exhausted through the rear of the automotive vehicle and the air being admitted through the top of the car will be the freshest air and will be free of any exhaust fumes and will give greater comfort and will greatly enhance the circulation of air within the interior of the car without the need of costly air conditioning equipment which, at its best maintains an artificial moisturized atmosphere.

The present invention is most effective in that it depends upon the movement of the vehicle and does not require any fans or power supply and is readily installed without the use of special mechanics and may, if desired, be either optional equipment put out by the automotive manufacturer or be subsequently installed by the purchaser of the vehicle.

Furthermore, all of this is done by a relatively simple installation which need not be factory installed but which may be installed by the driver or any garage from readily available spare parts and which will assure most comfortable air distribution without drafts or undue cooling or heating even where the air conditioning or air heater arrangement may also be employed.

Having now particularly described and ascertained the nature of the invention, and in what manner the same is to be performed:

What is claimed is:

An automobile ventilating system for an automobile vehicle having a body enclosure with front and rear obliquely disposed windshield windows and said body having a top which extends toward the front and rear windows, said body top carrying the system, said system having a ventilating air conduit extending longitudinally thereunder from the front windshield to the rear windshield and having an inlet at the front windshield and an outlet at the rear windshield, said conduit having a plurality of outlets along the length between the front and rear windows and control means to control the flow inwardly through the front of the windshield and outwardly from the conduit inside of and at the rear window, said conduit having transverse interior supply conduits within the automotive vehicle each having adjustable outlet closure doors, said means to control having manual elements at the rear and front of the automotive interior to control the amount of closure.

References Cited by the Examiner

UNITED STATES PATENTS

| | | | |
|---|---|---|---|
| 1,483,290 | 2/1924 | Eggimann | 98—2.7 |
| 1,758,573 | 5/1930 | Lucke | 98—2.7 |
| 1,778,591 | 10/1930 | Genett | 98—2.7 |
| 1,975,958 | 10/1934 | Kyle | 98—2.7 |
| 2,523,104 | 9/1950 | Emmert | 98—2.7 |

MEYER PERLIN, *Primary Examiner.*